UNITED STATES PATENT OFFICE.

WILLIAM H. BURNS, OF LOS ANGELES, CALIFORNIA.

CARBON FOR ELECTRIC LAMPS.

SPECIFICATION forming part of Letters Patent No. 446,660, dated February 17, 1891.

Application filed July 26, 1890. Serial No. 360,092. (No specimens.)

*To all whom it may concern:*

Be it known that I, WILLIAM H. BURNS, a citizen of the United States, residing at Los Angeles, in the county of Los Angeles and State of California, have invented a new and useful Improved Carbon for Electrical Purposes, of which the following is a specification.

The object of my invention is to produce a superior carbon for electrodes or carbon points used in electric-arc lighting.

My invention relates particularly to the material entering into the composition of my improved carbon.

My invention consists of the herein-described compound, composed approximately of ninety parts of triturated purified maltha coke and ten parts of semi-liquid purified maltha thoroughly incorporated therewith, and the resultant mixture, then molded under pressure.

In practice I produce my improved carbon by first retorting purified maltha, and thus reducing it to a coke, then by trituration reducing this coke to an impalpable powder, and then thoroughly incorporating therewith semi-fluid purified maltha in the proportions approximately of ninety parts, in bulk, of the triturated purified maltha coke to ten parts, in bulk, of semi-liquid purified maltha, and then molding this mixture by pressure into the form desired.

Now, having described my invention, what I claim as new, and desire to secure by Letters Patent, is—

The within-described carbon for electrical purposes, composed approximately of ninety parts of triturated purified maltha coke and ten parts of semi-liquid purified maltha thoroughly incorporated therewith, substantially as set forth.

WM. H. BURNS.

Witnesses:
JAMES R. TOWNSEND,
ALFRED I. TOWNSEND.